United States Patent

Goldmark et al.

[15] 3,678,181

[45] July 18, 1972

[54] COLOR FILM RECORDING AND REPRODUCING APPARATUS

[72] Inventors: Peter C. Goldmark, Stamford; John M. Hollywood, Greenwich, both of Conn.

[73] Assignee: Columbia Broadcasting System, Inc., New York, N.Y.

[22] Filed: Aug. 5, 1970

[21] Appl. No.: 61,424

Related U.S. Application Data

[63] Continuation of Ser. No. 862,564, July 25, 1969, abandoned, which is a continuation of Ser. No. 519,106, Jan. 6, 1966, abandoned.

[52] U.S. Cl.............................178/5.2, 178/5.4, 179/100.3, 178/6.7

[51] Int. Cl.......................................H04n 9/02, H04n 5/84

[58] Field of Search......................178/5.2, 5.2 A, 5.2 D, 5.4, 178/5.4 CD, 6.6 A, 6.7; 179/100.3

[56] References Cited

UNITED STATES PATENTS

| | | | |
|---|---|---|---|
| 2,736,762 | 2/1956 | Kell | 178/5.4 CR |
| 2,769,028 | 10/1956 | Webb | 178/6.6 A UX |
| 2,953,633 | 9/1960 | Hughes | 178/5.2 |
| 3,011,018 | 11/1961 | Sullivan | 178/6 |
| 3,239,604 | 3/1966 | Nemeth | 178/6.8 |
| 3,281,858 | 10/1966 | Schwettz et al. | 178/6.7 A UX |
| 3,316,348 | 4/1967 | Hufnagel et al | 128/6.7 |

*Primary Examiner*—Richard Murray
*Attorney*—Brumbaugh, Graves, Donohue & Raymond

[57] ABSTRACT

Apparatus and method for recording color picture information on a record medium, in which luminance information is recorded in one frame portion on the record medium and coded color information is recorded in a separate frame portion. Such luminance information may be in pictorial form and recorded either optically or electronically by a recording beam. The color information takes the form of a record including a first, carrier signal component modulated in amplitude and phase according to the color saturation and hue in the original scene and a superimposed reference carrier signal component bearing a fixed frequency relation to the color carrier signal, so that the recorded cycles of the respective carriers tend to be aligned in a common direction in the color frame. Recording may be carried out by scanning laser, electron or optical beam. as desired. The record medium may be reproduced by directing an image of a respective one of the frame portions to separate television cameras for producing a luminance signal and signals at the color and reference carrier frequencies.

38 Claims, 9 Drawing Figures

INVENTORS
PETER C. GOLDMARK &
JOHN M. HOLLYWOOD
BY
Brumbaugh, Free, Graves & Donohue
their ATTORNEYS

*INVENTORS.*
PETER C. GOLDMARK &
JOHN M. HOLLYWOOD
*BY*
Brumbaugh, Free, Graves & Donohue
their *ATTORNEYS*

INVENTORS
PETER C. GOLDMARK &
JOHN M. HOLLYWOOD
BY
Brumbaugh, Free, Graves & Donohue
their ATTORNEYS Patented July 18, 1972 3,678,181

4 Sheets-Sheet 4

INVENTORS
PETER C. GOLDMARK &
JOHN M. HOLLYWOOD

BY Brumbaugh, Free, Graves & Donohue their ATTORNEYS

COLOR FILM RECORDING AND REPRODUCING APPARATUS

This application is a continuation of application Ser. No. 862,564, filed July 25, 1969, now abandoned, which was a continuation of application Ser. No. 519,106, filed Jan. 6, 1966, now abandoned.

The present invention relates to color motion pictures and to methods and apparatus for recording color picture information on a record medium and for reproducing such information. More specifically, it relates to new an improved electronic techniques and equipment for recording color picture information in monochrome on a record medium and for reproducing said information in a simple yet highly effective manner.

Developments in color television technology have advanced to the stage where it appears that practically all television broadcasting will soon be done in color. A substantial part of such broadcasting will, naturally, involve the use of color motion picture film both for entertainment and for advertising purposes. This tends to be quite expensive because color film processing is costly and highly complex and expensive color television camera equipment is required for translating the color picture information on the film to electric signals suitable for utilization in broadcasting. In addition, it is common practice to use 16 mm. color prints for this purpose, and such prints are not comparable in quality with the 35 mm. color masters from which they are made because of losses in definition inherent in the processing techniques employed in making them.

In the search for solutions to these problems, proposals have been advanced heretofore for recording color information in coded form in monochrome. According to one scheme, brightness and color information in a picture are to be recorded in superimposed relation on black and white film in a series of transverse lines spaced longitudinally of the film, forming a succession of frames thereon. The color information is coded as modulation sidebands of a suppressed color carrier which is an odd multiple of one-half the horizontal line scanning frequency. In addition to the frames containing the picture information, physically separate reference frames displaying a color sampling frequency of reference phase and amplitude are adapted to be scanned on playback to generate a reference carrier for use in extracting the color information from the modulated color carrier sidebands.

A system of this kind is not practical because it is impossible to compensate properly for distortions caused by film imaging and scan so as to maintain on playback a correct phase relation between the reference carrier and the modulated color carrier sidebands. Normal back-and-forth lateral displacements of the film in a projector (film weave) can cause phase errors of magnitudes sufficient to give intolerable hue shifts in the reproduced picture. In addition, film shrinkage of the order of 1 percent or changes of comparable magnitude in scan width between the scanning of a frame containing recorded color information and the scanning of a reference frame can yield phase errors corresponding to many changes of color.

It has also been proposed to record in each frame line on the film a video signal representing brightness together with separate carrier signals, both above the highest frequency in the brightness band, and amplitude modulated, respectively, in accordance with the intensity variations of different colors. This requires an excessively wide frequency spectrum which places severe demands upon lens and film resolution. In addition, changes in focal conditions, as in corners or in film shifts from the focal plane, result in obvious hue changes. Also, the film density range must be shared by the several signals, so that the density range available to each must be reduced, and signal-to-noise and signal-to-film grain ratios become degraded.

Systems in this category are also subject to beats which interfere with the video signal representing the picture brightness. Efforts to eliminate such beats by recording the carriers separately in the interframe spaces for reinsertion in playback are subject to the difficulty mentioned above of maintaining the proper relation between the reinserted carrier and the modulation sidebands recovered by scanning the film.

It is an object of the invention, accordingly, to provide means enabling color picture information to be recorded in monochrome on a record medium and read out from the medium in a simple, inexpensive and effective manner.

Another object is to provide a novel motion picture record in which color information is recorded in coded form in monochrome.

A further object object of the invention is to provide a novel method and apparatus for producing from a record of the type described above electric signals representative of both color and picture information recorded thereon.

In accordance with the invention, picture brightness information and picture color information are recorded in separate adjacent areas of each picture frame on a record medium. Preferably, the picture brightness information and the picture color information are recorded in separate adjacent areas of each picture frame on a record medium. Preferably, the picture brightness information and the picture color information are recorded in separate adjacent parts of the same motion picture frame. The color information is recorded in coded form in monochrome, any suitable code being employed for this purpose. For example, the color information in each elemental line of a color picture may be presented as modulation sidebands of a suppressed carrier and recorded in parallel lines on the record medium, a suitable pilot frequency also being recorded in each line for use eventually in recovering the color information from the modulation sidebands.

By recording chroma and luminance information in separate film areas, higher modulating frequencies can be used for the chroma information and greater bandwidth for the luminance information within a total system bandwidth, than would be possible in a system where the two kinds of recorded information are required to share the same bandwidth. The use of separate areas for chroma and luminance information also insures freedom from visible pilot or carrier structure in the reproduced or transmitted pictures. Moreover, since the pilot carrier occupies the same film area as the chroma information congruence of the phase relationship between the pilot carrier and the color carrier is assured, regardless of any distortions in the film or in the scan.

Apparatus for producing a motion picture record according to the invention may comprises any suitable, high resolution color television camera capable of translating the color picture information contained in a conventional color motion picture into signals representing, respectively, the brightness and the color information in the picture. Typically, the brightness information may be represented by the NTSC "Y" signal and the color information by the NTSC "I" and "Q" signals.

Preferably, at least the "Y" signal, before recording, is subjected to a form of high frequency preemphasis known as aperture correction in both the horizontal and vertical directions of scan in an amount sufficient to compensate for all or a substantial part of the loss in definition occurring in processing and playback. The "Y" signal is recorded in monochrome in a portion of each frame of a conventional black and white film, for example.

The "I" and "Q" signals are used to modulate a carrier signal which produces modulated carrier sidebands varying in phase and amplitude in accordance with hue and saturation, respectively, in a suppressed carrier modulator. The modulation sidebands, in combination with the pilot frequency, are recorded in another portion of each frame of the black and white film. The film may then be processed in the conventional manner to produce a release print for use in subsequent reproducing operations.

Apparatus for reproducing the monochrome color picture record of the invention may comprise television camera means having provision for separate scanning of the adjacent portions of each frame carrying the brightness and the color information, respectively. From the former is derived a brightness signal which may be the conventional "Y" signal of the NTSC system. From the recorded color information are gotten the color modulation sidebands and the pilot signal. The pilot signal is used to restore the color carrier which in turn is employed to demodulate the color sidebands. From the demodulated sidebands are obtained color information representing signals which may be the conventional color difference signals R–Y, G–Y AND B–Y, for example. By adding the "Y" signal to the several color different signals, signals R, B and G representative of the color information in the picture are produced for reproduction by a monitor or for utilization in broadcast transmission.

For a better understanding of the invention, reference is made to the following detailed description of several typical embodiments, taken in conjunction with the accompanying drawings, in which.

Figure 1B:
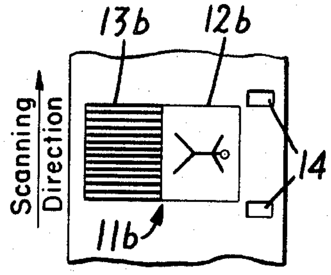
FIGS. 1A, 1B and 1C illustrate several different forms of color picture information records constructed according to the invention.
Figure 1C:
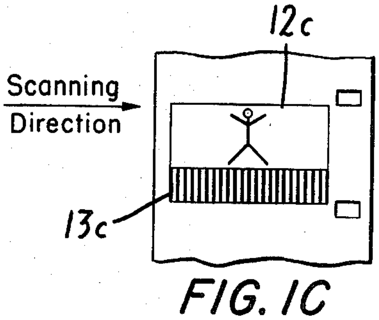
Figure 1A:
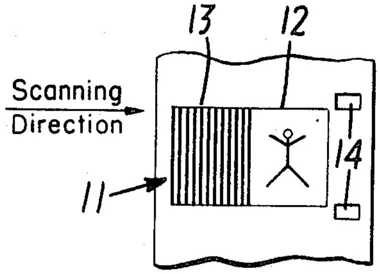

As shown in FIG. 1A, a typical monochrome record of color picture information, according to the invention, comprises for example, a conventional film base 10 of, say, 16 millimeter width, having recorded thereon a succession of frames 11 of picture information. Each frame is divided into two adjacent parts 12 and 13 which contain, respectively, luminance or brightness information and color information from a single frame of an original motion picture film in color.

The brightness or luminance information may be recorded in the frame portion 12 either optically or electronically as described in greater detail below, and preferably with the top to bottom dimension of the picture extending in the direction of movement, i.e., in the direction of the sprocket holes 14, as shown in FIG. 1A.

The color information recorded in the frame portion 13 preferably comprise a succession of parallel lines extending transversely of the film 10 and spaced longitudinally thereof, each line comprising a record of the modulation sidebands of a suppressed color carrier modulated as a function of the color information in the picture. Also recorded in each line is a pilot signal which is adapted to be utilized subsequently during playback to provide a carrier for extraction of the color information contained in the color modulation sidebands.

The pilot signal frequency should be outside of the frequency band occupied by the color sidebands and it may be one-half the color carrier frequency. Preferably, both the color carrier and the pilot signal frequencies should be multiples of the line rate employed in recording the lines so that the recorded information tends to form a succession of parallel bars extending longitudinally of the film 10, as shown in FIG. 1A.

In order to minimize registry problems, it is desirable that the frame portions 12 and 13 have the same area as shown in FIG. 1A. This requires that the frame portions 12 and 13 be anamorphosed in the direction extending transversely of the film essentially to a 2-to-3 aspect ratio.

Alternatively, frame portions **12*b* and 13*b* may be located side-by-side as in FIG. 1A but with the information recorded so that the top to bottom dimensions of the frame portions extend transversely of the film, as shown in FIG. 1B. For this format, the aspect ratio for the frame portions 12*b* and 13*b*** approximates the usual television aspect ratio of 4 to 3 and the images are not required to be anamorphosed. The scanning directions for the two areas are as indicated by the respective arrows.

In a further embodiment, shown in FIG. 1C, the brightness picture information may be recorded in an upper portion **12*c* of the frame with the coded color information below in the frame portion 13*c***, both frame portions being anamorphosed in the direction of film movement so that the relative widths of the two portions are in the ratio of, say, 2 to 1, the film scanning direction being indicated by the arrow in FIG. 1C.

Figure 2:
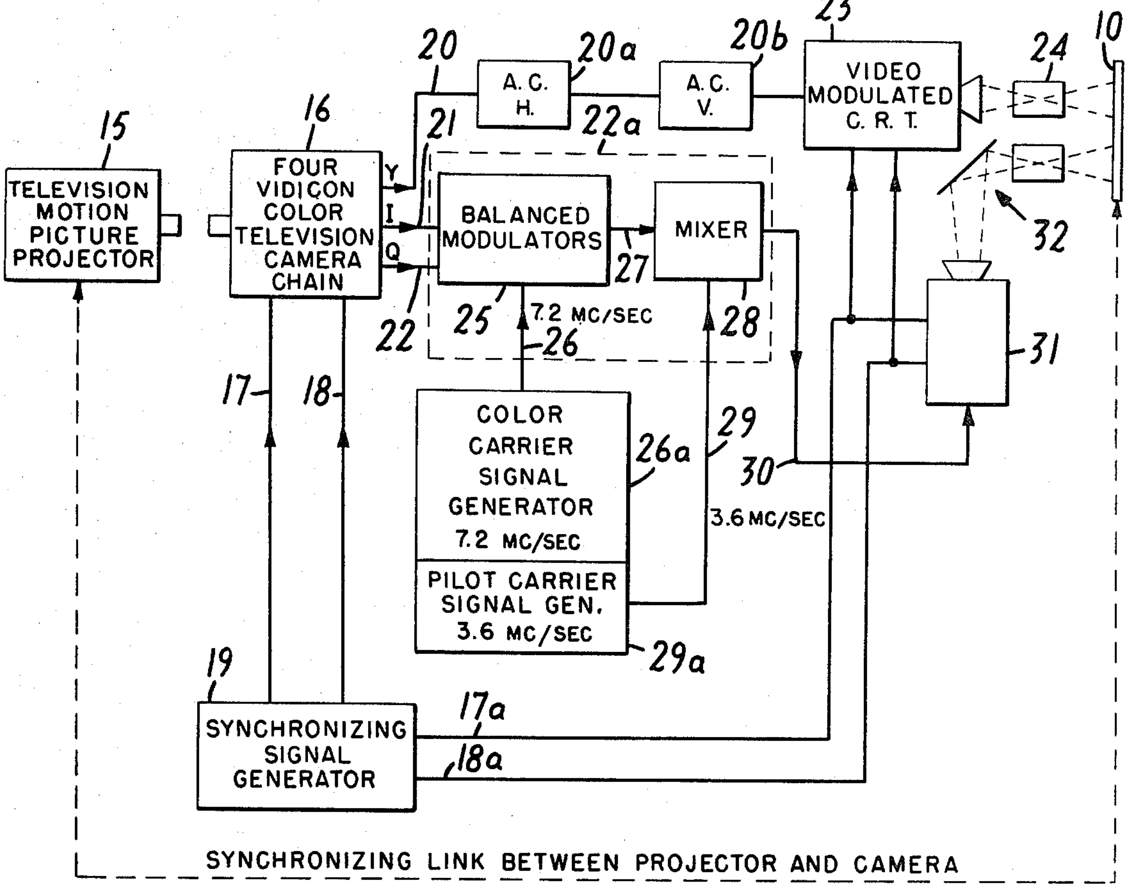
FIG. 2 is a schematic diagram of a typical system for producing a color picture record of the type shown in FIG. 1.

A monochrome color film record of any of the types shown in FIGS. 1A, 1B and 1C may be produced by the recording apparatus shown in FIG. 2. It comprises a conventional motion picture film projector 15 disposed to project a motion picture image in color to the sensitive elements to a conventional high resolution four vidicon color television camera chain 16. Suitable composite synchronizing and blanking signals may be supplied to the camera chain 16 from a conventional synchronizing signal generator 19 over the conductors 17 and 18. As is known, the color camera chain 16 may be arranged to provide color information representing output signals at the conductors 20, 21 and 22. In accordance with current practice in the United States, these may be the so-called Y, I and Q signals, as defined by the National Television Standards Committee (NTSC).

The "Y" or brightness signal from the film chain 16 is supplied through conventional horizontal aperture correction means **20*a* and vertical aperture correction means 20*b* to the intensity control electrode of a conventional cathode ray tube 23 which also receives blanking and horizontal and vertical deflection signals from the synchronizing signal generator 19 over the conductors 17*a* and 18*a***.

The horizontal aperture correction means **20*a* may be of the type disclosed in U.S. Pat. No. 3,011,018 to Sullivan preferably having constants selected to give a frequency preemphasis characteristic suitable for compensating for all losses in definition arising during processing and playback of the film 10**. It will be understood, of course, that only part of these losses may be compensated, if desired.

The vertical aperture correction means **20*b* may be of the kind described in an article entitled "A Vertical Aperture Equalizer for Television" which appears at pages 395–401, inclusive, of the Journal of the SMPTE, Volume 69, No. 6, June 1960. Here, again, the device should be designed to have a vertical equalizing characteristic adequate to compensate for substantially all losses in vertical resolution occurring in processing and playback of the film 10**, although compensation for less than all of such losses may be made, if desired.

The light spot from the cathode ray tube 23 is adapted to be directed through a suitable optical system 24 upon an ultra-fine grain monochrome film 10 contained in a suitable motion picture camera (not shown) operated in synchronism with the motion picture projector 15 by conventional means also not shown. The beam deflection in the tube 23, the lens system 24 and the camera for the film 10 are so arranged that the "Y" or brightness information is recorded in the proper frame portion **12, 12*b* or 12*c*** depending on which of the record forms shown in FIGS. 1A, 1B or 1C is desired.

The "I" and "Q" signals from the camera chain 16 are supplied over the conductors 21 and 22 to an encoder **22*a* comprising the balanced modulators 25 which also receive as second inputs over a conductor 26 a suitable color carrier signal from a signal generator 26*a*. The outputs of the modulators 25 are combined in the known manner so that only the modulation sidebands appear in the output, the carrier amplitude being zero when the modulation input is zero. The modulation sidebands of the color carrier signal are supplied from the modulators 25 over a conductor 27 to a mixer 28 in the encoder 22***a* which receives as a second input over a conductor 29 a pilot carrier signal from a signal generator 29*a*.

The sum of the modulation sidebands and the pilot carrier signal are supplied from the mixer 28 over a conductor 30 to modulate the bean intensity of another cathode ray tube 31, light from which is also directed through an optical system 32 upon the film 10.

The spot deflection direction in the cathode ray tube recorder 31, and the lens system 32 are also suitably disposed to record on the film 10 color information containing frame portions 13, 13*b* or 13*c* depending on which of the film records shown in FIGS. 1A, 1B and 1C is desired.

In a practical system, the motion picture projector 15 and the camera 10 might both be operated at fairly high speeds, say 48 frames per second, in the interests of economy. In order to insure a high quality picture, the camera chain 16 should preferably be designed for more than the usual 525 scanning lines per frame, say, 750 lines per frame. This would then necessitate a horizontal line scan frequency of approximately 48,000 lines per second. Under these conditions, a suitable bandwidth for the luminance channel might be approximately 13.5 megacycles per second.

Figure 2A:
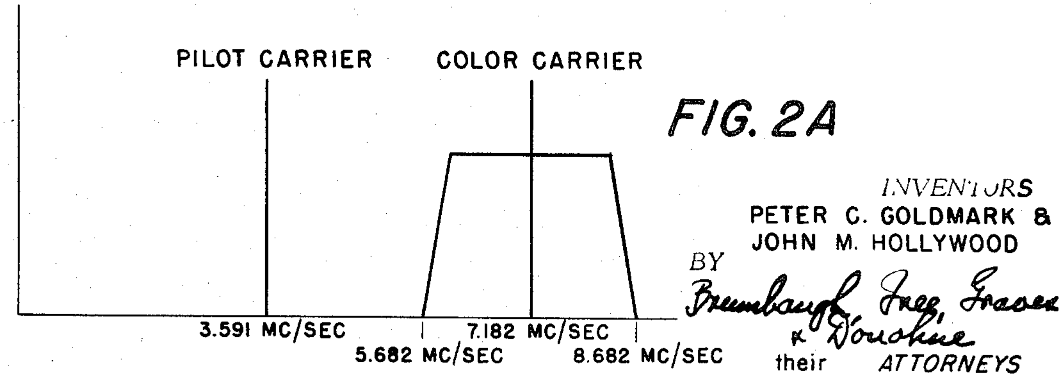
FIG. 2A is a graph depicting representative frequency and bandwidth conditions involved in recording color picture information with the system shown in FIG. 2.

Typical standards for the chroma information are represented in the graph of FIG. 2A. Thus, the color carrier frequency may be 7.2 megacycles per second and the chroma bandwidth approximately 1,500 kilocycles per second on either side of the carrier. A suitable frequency for the pilot might be approximately 3.6 megacycles which is one-half the color carrier frequency.

In operation of the system shown in FIG. 2, a standard color motion picture film is installed in the projector 15 and a standard 16 millimeter ultra-fine grain, monochrome unexposed film in the camera receiving the light from the recording cathode ray tubes 23 and 31. The projector 15 and the camera are then operated in synchronism at a rate of, say 48 frames per second. The camera chain 16 meanwhile is also operating at a rate of 48 frames per second in synchronism with the projector 15. The cathode ray tube recorders 23 and 31 and the optical systems 24 and 32 are so arranged that the desired one of the film records shown in FIGS. 1A, 1B and 1C will be obtained. In this fashion, a succession of frames 11, each comprising a portion 12 carrying brightness picture information and an adjacent portion 13 carrying coded color information is recorded on the film 10. After the entire film in the recording camera has been exposed, it may be processed in the usual manner and the negative thus produced utilized to provide as many positive release prints as may be required.

In addition, a number of slave units, each including cathode ray tube recorders, optical systems and a motion picture film camera as in FIG. 2 might be connected to receive the "Y" signal from the line 20, and color modulation sidebands and pilot carrier from the line 30 in such fashion as to produce a plurality of additional positive film records electronically as described above.

While both the brightness picture information and the color picture information are recorded electronically in the system described above, it will be understood that the brightness picture information might be put on the film optically. For example, the might be accomplished by exposing the film 10 in the camera directly to an image from the projector 15 through a conventional "Y" optical filter F, a half silvered mirror $M_1$ being employed to direct the beam from the projector 15 to the filter, with a mirror $M_2$ to direct the filtered beam to the film 10, as in FIG. 2B. In this embodiment, the cathode ray tube recorder 31 is suitably positioned to record the color information in the proper portion of each frame on the film 10. After the information has been recorded, the film is processed in the usual manner.

Figures 2B, 2C:
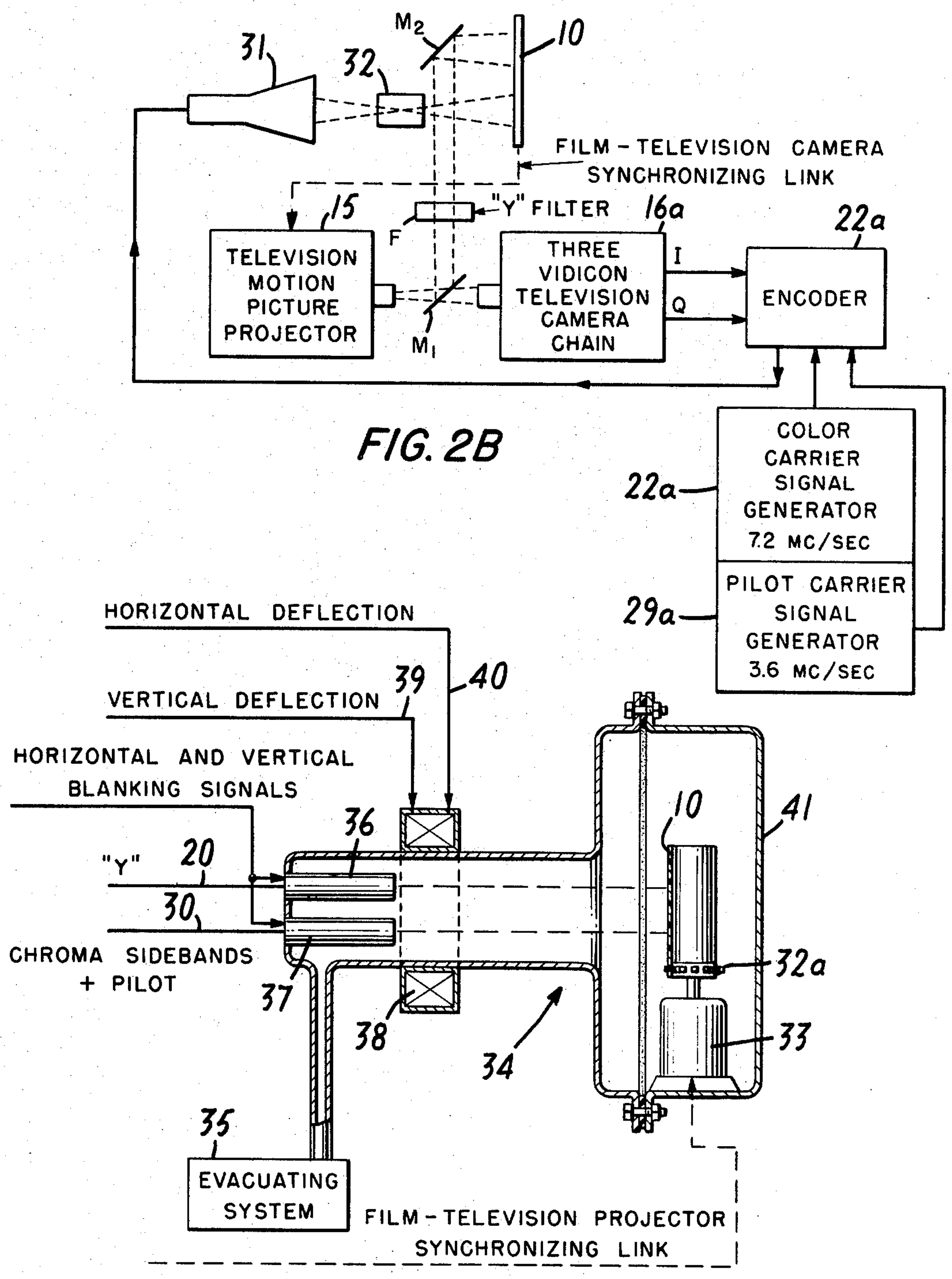
FIG. 2B is a schematic diagram showing how the luminance information can be recorded optically, instead of electronically in the system of FIG. 2.
FIG. 2C illustrates schematically how electron beam recording apparatus might be employed in the system shown in FIG. 2.

If desired, electron beam recording techniques may be employed for recording the brightness and the chroma information, as shown in FIG. 2C. In this case, the film 10 with its drive sprocket mechanism 32*a* and motive means 33 is removably mounted within a sealed enclosure 34 which is adapted to be evacuated by an evacuating system 35. Also mounted in the enclosure 34 are a pair of electron guns 36 and 37, the intensity control electrodes of which are connected, respectively, to receive the "Y" or brightness signal from the conductor 20, and the combined chroma sidebands and pilot carrier signal from the conductor 30 (FIG. 2), together with suitable horizontal and vertical blanking signals. Horizontal and vertical deflections are imparted to the beams from the electron guns 36 and 37 by conventional beam deflection coil means 38 which receives horizontal and vertical deflection signals from the synchronizing signal generator 19 (FIG. 2) over the conductors 39 and 40 (FIG. 2C).

In operation, the cover 41 of the enclosure 34 is removed and film 10 suitable for electron beam recording, and its drive sprocket 32*a* and motor 33 are placed in position. The cover 41 is then replaced and sealed in place by conventional means and the enclosure is evacuated to the proper beam recording pressure by the evacuating system 35. Color film to be reproduced is mounted in the projector 15 (FIG. 2) and it and the motor 33 (FIG. 2C) are placed in operation in synchronism with the four vidicon color television camera chain 16. The beams from the electron guns 36 and 37 record "Y" and chroma information in side-by-side frame portions on the film 10 and when the recording is completed the film 10 can be processed in the conventional manner to produce release prints.

Figure 2D:
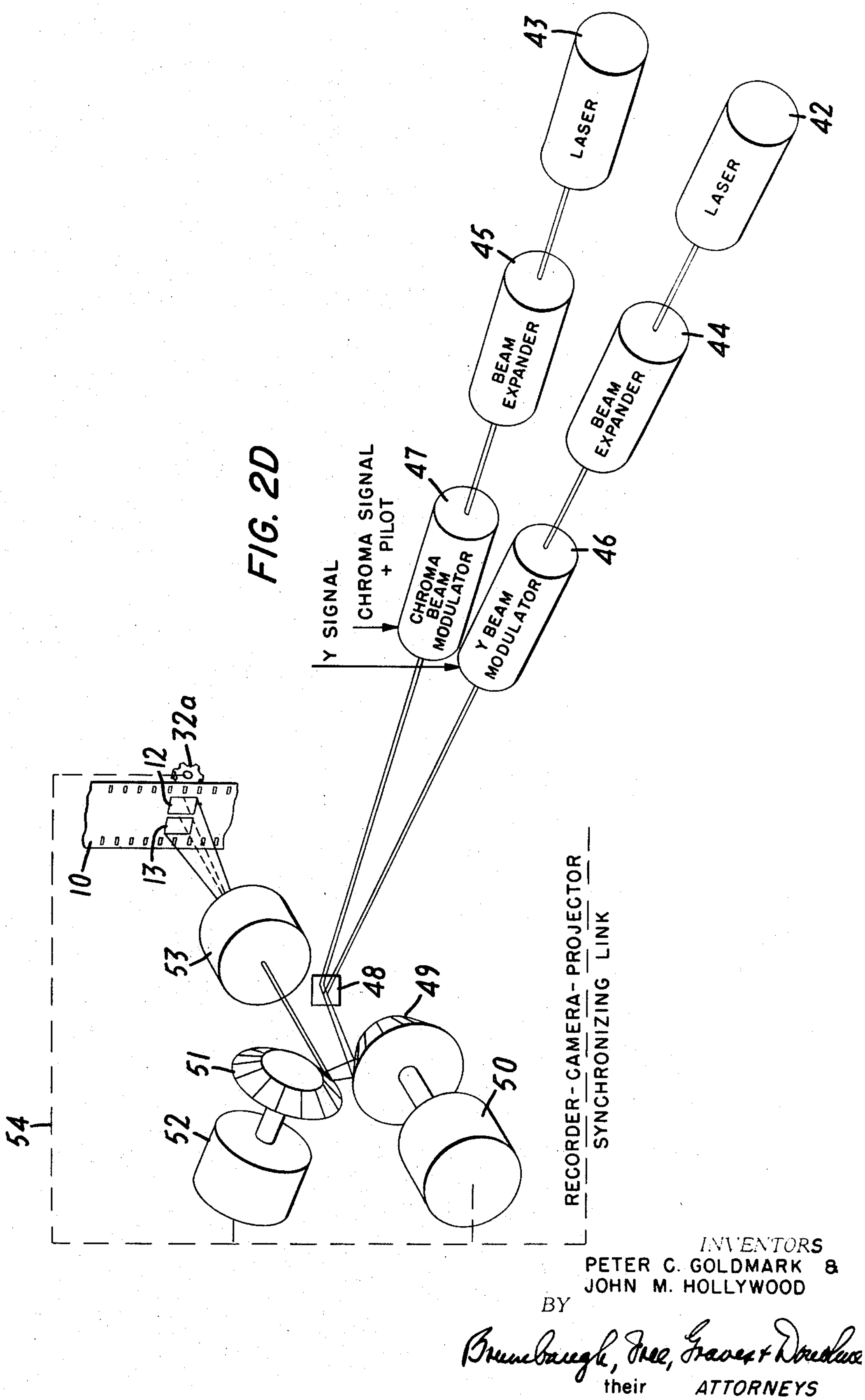
FIG. 2D illustrates schematically laser beam recording means adapted for use in the system depicted in FIG. 2.

Laser beam recording may also be employed for making monochrome film records of color picture information, as shown in FIG. 2D. In this embodiment, a pair of conventional lasers 42 and 43, preferably of the gas variety, direct laser beams, respectively, through conventional beam expanders 44 and 45 and beam modulators 46 and 47 to a plane mirror 48. The beam modulators may be of the type described in a communication entitled "The Use of Perovskite Paraelectrics in Beam Deflectors and Light Modulators" which appears at pages 1,258–1,259 of the October 1964 issue of the Proceedings of the IEEE. Such modulator comprises a rectangular sample of KTN ($KTa_{0.65}$ $Nb_{0.35}$ $O_3$) disposed between crossed polarizers and subjected to an electric field perpendicular to the light direction and at 45° with respect to the polarizer axes. If the laser is provided with a Brewster's angle exit window, as is the case in many commercial lasers, the laser beam will be polarized and the first polarizer may be omitted. The device uses the quadratic Kerr effect and the modulation of the beam is effected by applying an electric field transversely of the light beam. The electric field may be produced by applying the modulating signal voltage to electrically conducting plates (not shown) on opposite sides of the KTN sample.

The "Y" beam modulator 46 receives as input the "Y" or brightness signal suitably amplified. A DC bias may also be applied to obtain more sensitivity. The intensity of the beam from the laser 42 is then modulated in accordance with the "Y" signal.

The beam modulator 47 receives as input the combined chroma and pilot carrier signals. Thus, the intensity of the beam from the laser 43 is modulated in accordance with the combined chroma and pilot carrier signals. Suitable bias will allow the negative excursions to be accommodated.

Other materials such as KDP (potassium dihydrogen phosphate) employing the linear Pockels effect may be used as laser beam modulators, in which event the modulating electric field should be applied in the same direction as the light beam, using conventional transparent or apertured electrically conducting electrodes in front and in back of the crystal and in engagement therewith. Such an arrangement is described in Engineering report No. ER 7600 by Paul R. Yoder, dated January 1965, and entitled "Investigation of Techniques for Modulating and Scanning a Laser Beam to form a Visual Display," a copy of which may be obtained from the Clearing House For Scientific and Technical Information, U.S. Department of Commerce.

The modulated beams from the beam modulators 46 and 47 are reflected from the mirror 48 to a multifacet reflector rotor 49 driven by a motor 50, from which they are reflected to a second multifacet reflector rotor 51 driven by a motor 52. The beams are reflected from the reflector rotor 51 through a suitable lens assembly 53 which focuses the beams to spots of small size which are imaged on the film 10. The speeds of the motors 50 and 52 and the numbers of reflector facets on the rotors 49 and 51, respectively, are selected so as to impart horizontal and vertical deflections at the rates of say, 48,000 per second and 48 per second, respectively, to the beams impinging on the film 10 so as to can out adjacent frame portions 12 and 13 thereon.

The system is placed into operation by energizing the motors 50 and 52, and the drive for the film sprocket 32*a* to cause them to operate in synchronism with the projector 15 and the four vidicon color television camera chain 16 by a conventional synchronizing link represented by the dotted line 54 in FIG. 2D. The beams from the lasers 42 and 43, modulated in intensity in accordance with brightness and chroma information, respectively, are deflected horizontally and vertically by the multifaceted rotors 49 and 51, respectively, and trace out adjacent frame portions 12 and 13 on the film 10. In this fashion, the brightness and color information are recorded in monochrome on the film 10 which can then be processed in the usual manner.

Figure 3:
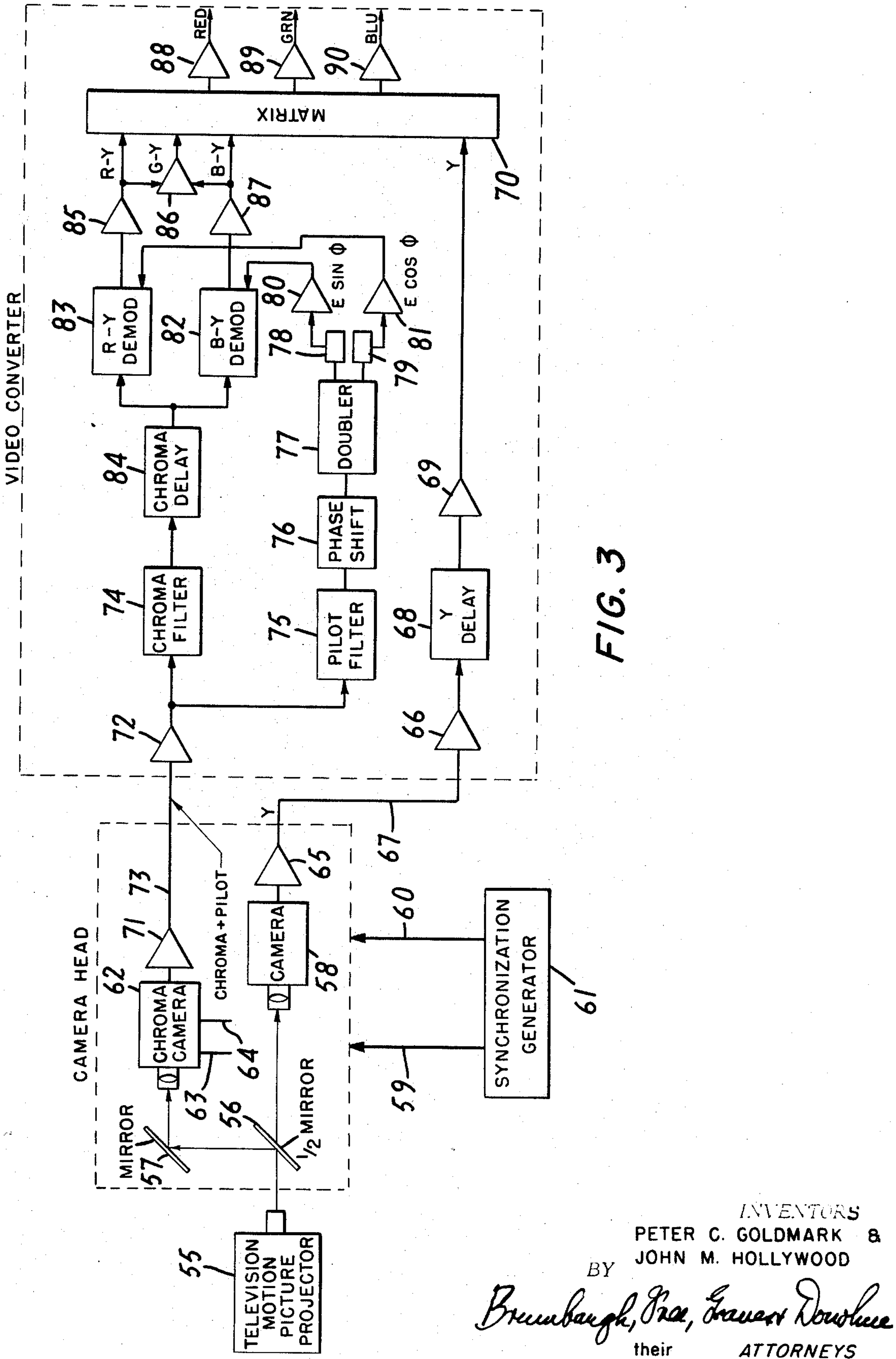
FIG. 3 is a schematic diagram of a typical system for reading out color picture information from a record of the type shown in FIGS. 1A, 1B and 1C.

Typical apparatus for scanning the information recorded on a film of one of the types described above to produce signals representing brightness and color is shown in FIG. 3. It comprises a standard motion picture projector 55 adapted to operate at, say, 24 frames per second with the usual three-two pull-down relationship and to direct an image to a beam splitter comprising a half-mirror 56 and a full-mirror 57. Half of the light from the projector passes through the half-mirror 56 to a standard vidicon camera 58 which may be operated under standard television broadcasting conditions, namely, at a horizontal line rate of 15,734 lines per second, and a vertical frame rate of 29.97 frames (59.94 fields) per second. To this end, it is supplied with suitable horizontal and vertical deflection and blanking signals over the conductors 59 and 60 from a synchronization generator 61.

Another half of the light from the projector 55 is reflected from the mirror 56 to the mirror 57 and from the latter to another standard black and white television camera 62 which also receives synchronizing and blanking voltages over the conductors 63 and 64 from the synchronization generator 61.

The brightness picture signal output from the television camera 58 is supplied through suitable amplifiers. 65 and 66 and conductor 67 and through a suitable delay line 68 and an amplifier 69 to a matrixing device 70 which will be described in greater detail later.

The chroma information carrying signal including the color carrier modulation sidebands and the pilot signal is transmitted through the amplifiers 71 and 72 and the conductor 73 to a chroma filter 74 and a pilot signal filter 75.

The pilot signal from the output of the filter 75 is supplied through a phase shifter 76 and a frequency doubler 77 which converts it to the carrier frequency and thence through two constant amplitude signal limiters 78 and 79 to two amplifiers 80 and 81, one of which provides a pilot signal output that is 90° out-of-phase with the pilot signal output from the other. The pilot signal outputs from the amplifiers 80 and 81 are supplied to two demodulator devices 82 and 83, respectively, which also receives as inputs the output of the chroma filter 74 through a conventional delay line 84. The demodulators 82 and 83 may be synchronous detectors which serve to extract the modulation from the modulated carrier sidebands providing a color difference signal R–Y through an amplifier 85 to the matrix 70 and also to a matrixing amplifier 86. The demodulator 82 also supplies a color difference signal B–Y through an amplifier 87 to the matrix 70 and to the matrixing amplifier 86 which derives a third color difference signal as $$(G-Y) = -0.51\ (R-Y) - 0.19\ (B-Y)$$

This color difference signal is also supplied to the matrixing device 70.

The matrixing device 70 is a computer of conventional type which serves to combine the R–Y, G–Y, B–Y, and Y representing signals in the known manner so as to produce three outputs representing the colors red, green and blue in the original from which the monochrome film was made. These outputs are fed through amplifiers 88, 89 and 90 from which they may be supplied to a conventional color encoder for broadcast use in the event that color picture television transmission is contemplated.

The invention thus provides simple yet highly effective means for deriving from a color motion picture record color information signals suitable for broadcast or other use. By recording brightness and color picture information, respectively, in monochrome in adjacent portions of successive motion picture frames, the need for color film processing is reduced while relatively simple equipment can be used for playback. Also, by utilizing very high quality standards in making the monochrome master, and by subjecting the signals to be recorded to sufficient horizontal and vertical aperture correction to compensate for all or part of the losses in resolution suffered in the making or playback of the film record, prints of high quality can be obtained for television broadcast. As a result, the advantages of color television film broadcasting can be secured without the great expense heretofore involved where prior art techniques were employed, and with improved resolution.

The specific embodiments described herein are intended to be merely illustrative and it will be understood that modifications in form and detail are possible within the spirit of the invention. For example, the desired 1,000 line per frame standard desired for the four vidicon color television camera chain might be achieved by a quadruple interlace technique utilizing four interlaced fields displaced vertically from one another by one-fourth of the displacement between the first and fourth fields, the horizontal and vertical scanning rates being appropriately selected to accomplish this result. Also, the usual Y, I and Q signals may be extracted on playback, instead of signals representing the primary colors red, blue and green. Other variations will be apparent to those skilled in the art.

The invention, therefore, is intended to encompass all such modifications as fall within the scope of the following claims.

We claim:

1. In apparatus for recording in monochrome on a record medium color picture information in at least one scene to be recorded, the combination of video signal source means for providing at least signals representative of color information in said scene,
   - record medium camera means,
   - means for directing to an image plane in said record medium camera an image of luminance information in said scene for recording said image in one area on said record medium,
   - and means responsive to said signals for directing to said image plane in said record medium camera means an image of an encoded monochrome representation of color information in said scene for recording said image in a separate area on said record medium.

2. Apparatus as defined in claim 1 in which said record medium camera means is adapted to record representations of said luminance information and said color information in each of a succession of frames on said record medium, each of said frames containing a luminance information representation of a scene in one area thereof and a monochrome color information representation of a scene in another area thereof.

3. Apparatus as defined in claim 1 in which the means for directing an image of luminance information in said scene comprises optical means interposed between said scene and said image plane.

4. Apparatus as defined in claim 1 in which said video signal means is also adapted to provide signals representative of luminance information in said scene and the means for directing an image of luminance information in the scene to the image plane in the record medium camera means is responsive to said last-named signals.

5. Apparatus as defined in claim 4 in which said record medium camera means is disposed in an evacuatable enclosure, and the means for directing images of luminance and of color information in said scene comprises a plurality of electron gun means in said enclosure adapted, respectively, in accordance with said signals representative of luminance information in said scene and with said signals representative of color information in said scene.

6. Apparatus as defined in claim 4 in which the means for directing images of luminance information and of color information in said scene comprises means for generating a plurality of laser beams, means for directing said laser beams to different areas of said image plane, and means for modulating the intensities of said laser beams, respectively, in accordance with said signals representative of said luminance information, and with said signals representative of said color information in said scene.

7. Apparatus as defined in claim 1 in which said record medium camera means is disposed in an evacuatable enclosure, and the means for directing an image of color information in the scene to be recorded comprises electron gun means in said enclosure adapted to direct an electron beam to an image area of said image plane in said record medium camera means, and means for modulating said electron beam in accordance with said signals representative of color information in said scene.

8. Apparatus as defined in claim 1 in which the means for directing an image of color information in said scene comprises means for generating a laser beam, means for directing said laser beam to said image plane, and means for modulating the intensity of said laser beam in accordance with said signals representative of said color information in said scene.

9. Apparatus as defined in claim 1 in which said video signal source means is adapted to provide color difference signals representative of color information in the scene to be recorded, balanced modulator means is provided for modulating a high frequency carrier signal in accordance with said color representing signals, means is provided for combining with the modulation sidebands of the carrier a pilot signal at a frequency bearing a fixed relation to the color carrier frequency, and the means for directing the monochrome image of a representation of the color information in the scene to be recorded is responsive to the combined modulation sidebands and pilot signal.

10. Apparatus as defined in claim 1 in which said video signal source means is a color television camera.

11. Apparatus as defined in claim 10 in which color motion picture projector means is provided for directing an image of the scene to be recorded to the color television camera means, and means is provided for maintaining synchronism between said projector, the color television camera means and the record medium camera means.

12. Apparatus as defined in claim 1 in which said encoded representation of color information in said scene comprises a record of a suppressed color carrier signal modulated with said color information and a superimposed record of a reference carrier signal at a different frequency.

13. A color picture record comprising a record medium having recorded in separate areas thereon monochrome representations of luminance information and color information, respectively, in at least one color picture, said color information representation comprising a record of a suppressed carrier signal modulated with said color information and a superimposed record of a reference carrier signal at a different frequency.

14. A color picture record as defined in claim 13 in which the cycles of the color and reference carrier signals are in substantial alignment in a common direction in the color information area.

15. A color picture record as defined in claim 14 in which the separate areas containing said luminance information and said color information are adjacent areas.

16. A color picture record as defined in claim 14 in which the sizes of the recorded representations are substantially the same.

17. A color picture record as defined in claim 14 in which the sizes of the recorded representations are different.

18. A color picture record as defined in claim 14 in which the separate areas are laterally spaced.

19. A color picture record as defined in claim 14 in which the separate areas are longitudinally spaced.

20. In apparatus for reproducing color picture information recorded on a record medium in a succession of information-bearing areas including areas carrying luminance picture information and different areas carrying color picture information in the form of superimposed records of a first color carrier signal component and a second reference carrier signal component at a different frequency, the combination of record medium projector means, plural television camera means, optical means interposed between said projector means and said plural television camera means for directing images of the color information representing and luminance information representing areas projecting by said projector means to said respective television camera means, the television camera means receiving the color information image providing a signal including said reference and modulated color carrier signal components, means jointly responsive to said carrier signal components for deriving color information signals, and means responsive to the output of the television camera means receiving the luminance information image for producing luminance information representing signals.

21. Color picture information reproducing apparatus as defined in claim 20 in which the optical means comprises beam splitter means disposed to receive the color information and luminance information images projected by the projector means, and the television camera means comprises a pair of television camera means disposed to receive said color information and luminance information images, respectively.

22. Apparatus as defined in claim 20, in which the color information signal deriving means includes filter means for separating said first and second carrier components, the apparatus further comprising means jointly responsive to said luminance information representing signals and to a function of said separated carrier components for producing a plurality of signals representing color and brightness information in a color picture.

23. Apparatus as defined in claim 20, in which the first signal component is in the form of suppressed carrier modulation sidebands, the color information signal deriving means including filter means for separating said first and second carrier signal components and for supplying them to first and second channels, respectively, means in said second channel for converting said second signal component to a third signal at the frequency of said first signal component, synchronous detector means in said first channel and jointly responsive to said first signal component and to said third signal for producing fourth signals representing the modulation carried by said sidebands.

24. Apparatus as defined in claim 23 together with matrix means responsive to said color difference signals for producing a plurality of signals representing different colors, respectively.

25. In a method for producing a high resolution monochrome record of luminance and color information in a subject in which losses in resolution occur due to limitations of reproducibility by the record of recorded information when said record is scanned by television techniques, the steps of scanning the subject line by line to a high degree of resolution to produce first signals representative of luminance information in the subject and second signals representative of color information in the subject, subjecting at least said first signals to high frequency preemphasis of such character as to compensate at least partially for the total resolution losses caused in both the making and playback of said monochrome record, recording said preemphasized first signals in a first frame area on a monochrome record medium, and recording said second signals in a second frame area on said record medium.

26. In apparatus for recording in monochrome on a record medium color picture information in a scene to be recorded, the combination of color television camera means adapted to view a scene to be recorded for providing at least signals representative of color information in said scene, record medium camera means, means for directing to an image plane in said record medium camera means an image of luminance information in said scene for recording said image in one area on said record medium, and means responsive to said signals for directing to said image plane in the record medium camera means an image of an encoded, monochrome representation of substantially all color information in said scene for recording said image in a different area on said record medium.

27. Apparatus according to claim 26, in which:

said encoded representation comprises a record of a color carrier signal modulated as a function of said color information.

28. A color picture record comprising a record medium having recorded in different areas thereon monochrome representations of luminance information and encoded, non-pictorial color information, respectively, in a color picture.

29. A color picture record as set forth in claim 28, in which:

said different areas are disposed in laterally adjacent longitudinally extending track portions on said medium.

30. A color picture record according to claim 28, in which:

the encoded, non-pictorial color information comprises a record of a carrier signal modulated with color information and a superimposed record of a reference carrier signal at a different frequency.

31. A color picture record according to claim 30, in which:

the recorded carrier records are disposed in contiguous elemental areas extending in a common direction across the color information area, each corresponding to a like elemental area of the original color picture.

32. A color picture record according to claim 31, in which:

cycles of the carriers recorded in separate elemental areas are generally aligned in a direction normal to the common direction of extension of those areas.

33. In combination with a color picture record according to claim 30, apparatus comprising:

means for subjecting each of the different areas to a line scanning operation to develop video signals representing the luminance information and the carriers at different frequencies.

34. A color picture record according to claim 28, in which:

the different areas are adjacent portions of an information frame area on the record medium.

35. In combination with a color picture record according to claim 28, apparatus comprising:

means for subjecting each of the different areas to a line scanning operation to develop separate signals representing the luminance information and color information respectively.

36. Apparatus according to claim 35, further comprising:

means jointly responsive to the carrier signals at different frequencies for producing a signal representing modulation of the modulated carrier.

37. In apparatus for reproducing color picture information recorded on a record medium in a succession of information-bearing areas including first areas carrying luminance picture information and second areas carrying encoded color picture information, the combination of means for advancing said record medium through a scanning zone, and means for scanning said first and second areas of said record medium and operative to produce in response to said scanning first and second separate video signals representative of the recorded luminance and color information, respectively.

38. In apparatus for reproducing color picture information recorded on a record medium in a succession of information-bearing areas including areas carrying luminance picture information and different areas carrying color picture information in the form of superimposed records of a first color carrier signal component and a second reference carrier signal component at a different frequency, the combination of record medium projector means, plural television camera means, optical means interposed between said projector means and said plural television camera means for directing images of the color information representing and luminance information representing areas projected by said projector means to said respective television camera means, the television camera means receiving the color information image providing signals including said reference and modulated color carrier signal components, and the television camera means receiving the luminance information image providing signals representing said luminance information.

* * * * *